C. L. QUEAR.
SOIL TESTER.
APPLICATION FILED APR. 3, 1916.
1,233,505.
Patented July 17, 1917.
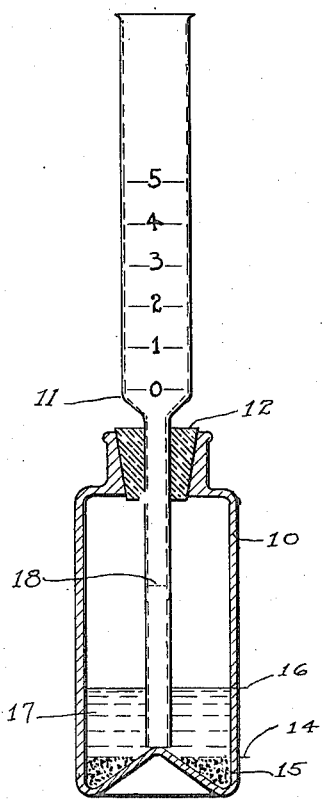
WITNESSES:
J H Swan
J. H. Wells
INVENTOR
Charles L Quear
BY
Lockwood & Lockwood
ATTORNEYS

UNITED STATES PATENT OFFICE.

CHARLES L. QUEAR, OF MUNCIE, INDIANA.

SOIL-TESTER.

1,233,505.　　　Specification of Letters Patent.　　Patented July 17, 1917.

Application filed April 3, 1916. Serial No. 88,562.

*To all whom it may concern:*

Be it known that I, CHARLES L. QUEAR, a citizen of the United States, and a resident of Muncie, county of Delaware, and State of Indiana, have invented a certain new and useful Soil-Tester; and I do hereby declare that the following is a full, clear, and exact description thereof, reference being had to the accompanying drawings, in which like numerals refer to like parts.

The object of this invention is simplicity, smallness and convenience in use of a device for testing soils. To be practical and useful to a multitude of farmers a soil testing device cannot be complicated or such as they cannot conveniently carry around with them and which must be mounted in a special place and manner for its use. Such devices will be of little value to the public until they are made small and compact so that they can easily be carried around in a farmer's pocket and so that the soil can be tested at any place or time without inconvenience to the farmer.

Also the soil tester should be such as would not only determine the percentage of the free carbonates in the soil, but also the percentage of acids therein. Therefore, to make a very simple and conveniently used device, capable of determining the free carbonates and also the acids in the soil, and which will be a great practical aid in enabling farmers to determine the quality of their soils so that they can obtain the maximum results from their fields, is the object of this invention.

The chief feature of the invention consists merely in the combination with a small glass jar, of a tube extending down through the cork thereof almost to the bottom and having its upper end enlarged somewhat and graduated. The lower end of the jar is internally convex with its apex coming rather close to the lower end of the tube so that the gases arising therefrom will not enter the tube, but go to the top of the jar and force water down in the jar and up into said tube.

This makes a very simple apparatus requiring only a few minutes time to complete any test and enables one to determine the percentage of free calcium carbonates or the percentage of acids as desired.

The full nature of the invention will be understood from the accompanying drawing and the following description and claims.

The drawing is a central vertical section of the device.

This soil tester consists of only two parts, a jar 10 and a glass tube 11 inserted through the cork 12 of the jar.

The tube 11 has its lower end reduced and long enough to extend almost to the bottom of the jar, and the upper end of the tube is enlarged and provided with graduations having indicating numerals reading upward.

The bottom of the jar is preferably very concave, so much so that the apex of the bottom of the jar comes very close to the lower end of the tube 11. Also the outer surface of the jar is graduated at 14 to indicate the desired position of the top of the earth 15 or other substance. There is also a graduation mark at 16 for indicating the desired elevation of the fluid in the jar. There is also an indicating mark 18 on the lower part of the tube 11 for indicating the normal elevation of the fluid in the tube. The upper end of the tube is open.

The device is used and operates as follows: 20 grams of substance is used as the basis in this tester. The soil 15 to be tested is placed in the jar 10 to a height slightly below the apex of the bottom of the jar. There will then be no earth on the bottom of the jar under the tube 11 so that any gas formed from said soil will not pass into the tube 11, but into the upper part of the jar 10.

Water is then introduced into the jar 10 until it reaches the graduation 16 on the bottle. Then the tube is inserted in the bottle and the cork secured tightly, the solution rising in the tube 11 approximately to the indication mark 18 thereon. The water rises to this point due to the pressure exerted in forcing the stopper tightly into the bottle.

Sulfuric acid is then introduced through the tube 11 until the fluid rises in the tube 11 to the indication mark 18. The sulfuric acid, being heavier than water, gradually passes into the bottom of the bottle and the soil or other material to be tested becomes disintegrated by contact with the acid and carbon dioxid gas will be developed from the free carbonates in the soil. The resulting gas within the jar above the fluid will exert a pressure on the fluid and raise the fluid level in the tube to some indicating numeral on the graduated scale on the upper or larger part of tube 11, and thus register the per cent. of lime indicated by the test.

When testing for acid the same device is used, but finely powdered calcium carbonate in suspension in water is used instead of the sulfuric acid used when testing for carbonates.

The purpose of the peculiar construction of the bottom of the jar with reference to the lower end of the tube 11 is to prevent any appreciable amount of soil from lying on the bottom directly under the lower end of the tube 11. Instead the soil surrounds the apex of the bottom. Therefore, the gas arising from the soil will not enter the tube 18, but only rises to the chamber in the upper part of the jar and when it accumulates there, will exert a downward pressure on the surface of the water or fluid and force it up the tube to the graduated scale.

The invention claimed is:

1. An apparatus for determining the percentage of carbonates or the percentage of acids in materials including a jar having its lower end internally convex and a measuring tube adapted to extend into said jar into close proximity with the apex of said convex end, an enlarged portion on said tube above said jar and graduation marks on said enlarged portion for measuring the discharge of the contents of said jar.

2. A soil tester consisting of a jar with the lower end conical in form and extending upward within the jar, a stopper, and a tube extending through the stopper down into close proximity with the apex of said conical end, the upper portion of the tube being graduated.

3. A soil tester consisting of a jar having its lower end conical in form and extending upward within said jar, a stopper, a tube extending through said stopper down into close proximity with the apex of said conical end, an indicating mark on said tube within said jar, an enlarged portion on said tube above said jar and graduation marks on said enlarged portion for measuring the discharge of the contents of said jar.

In witness whereof, I have hereunto affixed my signature in the presence of the witnesses herein named.

CHARLES L. QUEAR.

Witnesses:
   Floss Hartman,
   F. R. Griffith.

Copies of this patent may be obtained for five cents each, by addressing the "Commissioner of Patents, Washington, D. C."